May 20, 1969     H. NERWIN     3,444,795

FILM CARTRIDGE CODE ARRANGEMENT

Filed March 7, 1966     Sheet 1 of 2

HUBERT NERWIN
INVENTOR.

BY Robert W. Hampton
Malcolm F. Dunn

ATTORNEYS

HUBERT NERWIN
INVENTOR.

ATTORNEYS

United States Patent Office 3,444,795
Patented May 20, 1969

3,444,795
FILM CARTRIDGE CODE ARRANGEMENT
Hubert Nerwin, Rochester, N.Y., assignor to Eastman
Kodak Company, Rochester, N.Y., a corporation of
New Jersey
Filed Mar. 7, 1966, Ser. No. 532,416
Int. Cl. G03b 19/04
U.S. Cl. 95—31                               7 Claims

ABSTRACT OF THE DISCLOSURE

A film cartridge is provided with a plurality of adjacent code positions for indicating various characteristics of the film contained within the cartridge. The code positions are determined with respect to a locating notch. At least two of these code positions are notched so that the information can be detected by a sensing apparatus.

---

The present invention relates to film cartridges and the provision on such film cartridges of an improved coding arrangement by which devices of film identifying apparatus will detect the code and actuate such apparatus in a predetermined manner in accordance with the particular code detected.

Code arrangements on film cartridges of the prior art have been primarily for use in cameras having code detecting devices. In my U.S. patent application Ser. No. 163,843, filed Jan. 2, 1962, now abandoned in favor of co-pending continuation application Ser. No. 424,615, filed Jan. 11, 1965, and its co-pending divisional application Ser. No. 424,482, filed Jan. 11, 1965, a disclosure was made of a code arrangement on a film cartridge which could be detected by apparatus other than a camera.

Also, such code arrangements on film cartridges of the prior art are dependent on the cartridge being properly seated in operating position within a camera having a code detecting device; and therefore, the exterior physical dimensions of such film cartridge control the orientation of the code arrangement on the film cartridge with the code detecting device on the camera.

One of the objects of the invention is to provide on a film cartridge an improved coding arrangement by which cameras and other apparatus having appropriate code detecting devices may be able to detect the code arrangement on such film cartridges.

Another object is to provide on a film cartridge an improved coding arrangement including code indicia, and reference means from which the code indicia is located and by which the code indicia on the film cartridge will be accurately oriented relative to the detecting device of a film identifying apparatus.

Other objects of the invention will appear from the following description, reference being made to the accompanying drawings in which.

Figure 1:
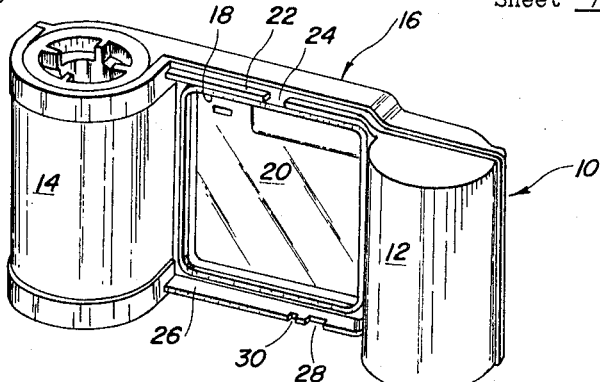
FIG. 1 is a perspective view of one embodiment of a film cartridge and illustrating an example of one code combination of a range of combinations.

My invention is directed to forming on an exterior surface of a film cartridge a unique code arrangement which may be detected by film identifying apparatus having code detecting devices, such as a sorting apparatus for sorting cartridges in accordance with the film contained therein in preparation for sending the film that is subsequently removed from the cartridge to processing. Although there have been disclosures of tactile code protuberances or embossings on the exterior surfaces of film cartridges in the prior art, such protuberances or embossings were formed at the same time as the film cartridges were formed.

In my above-mentioned co-pending application I disclosed for the first time, as far as I had been able to determine, the formation of a tactile code on a film cartridge by the removal of material from a previously formed film cartridge. In other words, instead of forming a plurality of film cartridges for each different code protuberance representing different film characteristics, as taught by the prior art, my co-pending application disclosed a tactile code which could be formed on a preformed film cartridge either at the time it was determined what film would be factory-loaded in the film cartridge or after such factory-loading. My disclosure thus eliminated the necessity of stock-piling film cartridges of the same type but with the different codes that were formed at the time the film cartridge was made.

In my co-pending application, I also disclosed for the first time, as far as I am aware, not only the formation of tactile code means on one surface of the film cartridge to be detected by camera mechanism for automatically adjusting the camera for the film speed or ASA index of the film contained in the cartridge, but also the formation of tactile code means on another surface of the same film cartridge by which apparatus such as a sorting apparatus having code detecting devices could identify and sort the individual cartridges prior to the removal of the film so that the films would be sent to the proper processing solutions. Since different film manufacturers make films having similar emulsion film speeds but requiring different developing processes, it is necessary to have two tactile code arrangements on the film cartridge to serve the two functions of speed input into a camera and sorting of the cartrirdge before processing.

In my co-pending application I further disclosed for the first time, as far as I am aware, the possibility of a binary or multiple code arrangement on a film cartridge to increase the number of combinations possible along the particular exterior surface of the film cartridge concerned.

The present invention relies on all of the concepts disclosed in my co-pending application but distinguishes over such application by the further formation of a tactile reference means from which the location on the film cartridge of the tactile code is determined, and from and by which the code sensing devices of film identifying apparatus will be properly oriented to detect the correct code combination for accurate identification of the film.

Although my present disclosure speaks of sorting apparatus, I also intend my unique code arrangement to be usable in cameras having sensing devices which first detect the tactile reference means on the film cartridge, and then the code detecting devices are properly oriented relative to such tactile reference means to detect the appropriate code combination.

Although my present disclosure also speaks of a tactile code arrangement, which implies a physical sensing operation as by a plurality of levers, to be distinguished from electrical or magnetic sensing, I also intend tactile sensing to mean light beam sensing and fluid pressure devices, to mention only a few possibilities. These light beam sensing devices or fluid pressure devices would be triggered into a condition of readiness by the passing therebefore on a conveyor or the like of a film cartridge with the tactile reference means in foremost position followed by the particular code combination that would subsequently be sensed.

Accordingly, in referring now to the drawings, I disclose various code arrangements possible on different types of film cartridges, and it should be readily recognized that the scope of my invention is equally applicable to other types of film cartridges.

Figure 2:
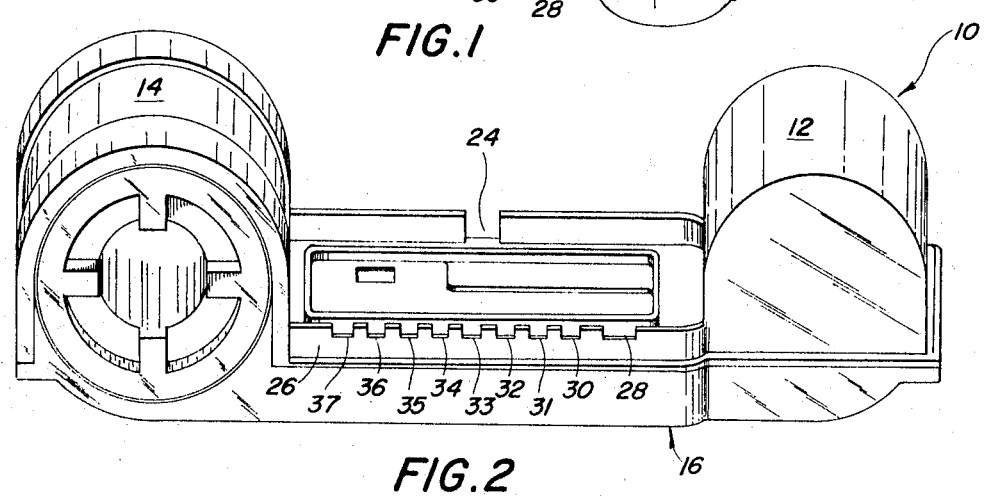
FIG. 2 is an enlarged revolved elevation view of the film cartridge shown in FIG. 1 and illustrating a range of combinations.

In FIGS. 1 and 2, a film cartridge 10 is disclosed and which has a film supply chamber 12, a film take-up chamber 14, and an intermediate member 16 which spaces and connects the two chambers and through which the film passes from one chamber to the other. The exposure aperture is shown at 18 and a section of the film 20 is illustrated in position within the exposure aperture for exposure. For complete details of the construction of this type of film cartridge, reference may be had to my U.S. Patent No. 3,138,081, granted June 23, 1964, which was a divisional application of my above-mentioned co-pending application.

In reference to FIG. 1, the rib 22 along the top portion of the film cartridge adjacent the exposure aperture 18 serves as one exterior surface in which a tactile discontinuity or notch 24 is formed by the removal of material to represent a particular film characteristic such as the film emulsion speed. Such code discontinuity or notch 24 is to be detected by suitable devices in a camera which will adjust automatically the exposure control of the camera in accordance with the code detected. My above-mentioned co-pending application discloses several different such exposure control arrangements. The rib 26 along the bottom portion of the film cartridge adjacent the exposure aperture serves as a second exterior surface in which a tactile reference discontinuity 28 and a tactile code discontinuity 30 are similarly formed by removal of material. Since, however, the tactile reference discontinuity will not vary in location from cartridge to cartridge, it may also be formed at the same time that the cartridge is formed. The tactile code discontinuity shown in FIG. 1 represents the code combination No. 1 from the series of combinations shown in Table A below. The tactile code discontinuity is located a predetermined distance from the tactile reference discontinuity, and the latter is made wider than the code discontinuity so that there will be no confusion between the two types of discontinuities. For example, a reference detecting lever would drop into such discontinuity but not into a code discontinuity, and since it would be necessary that the reference discontinuity be detected first so as to condition the code sensing levers for their operation, there would be no danger of a narrow code sensing lever dropping first into the reference discontinuity. Although I have disclosed the reference discontinuity as being greater in size, as by width, than the code discontinuity, the situation could be reversed with the reference discontinuity having a width smaller than the code discontinuity.

As will be evident from the arrangement disclosed in Table A below, there may be one code discontinuity in eight different positions, or all eight discontinuities in their positions, or any possible combination therebetween. In FIG. 2, the additional code discontinuities 31, 32, 33, 34, 35, 36 and 37 are illustrated along with code discontinuity 30 for a total of eight (8) code discontinuities, which represent code combination No. 255 from Table A below.

Figure 3:
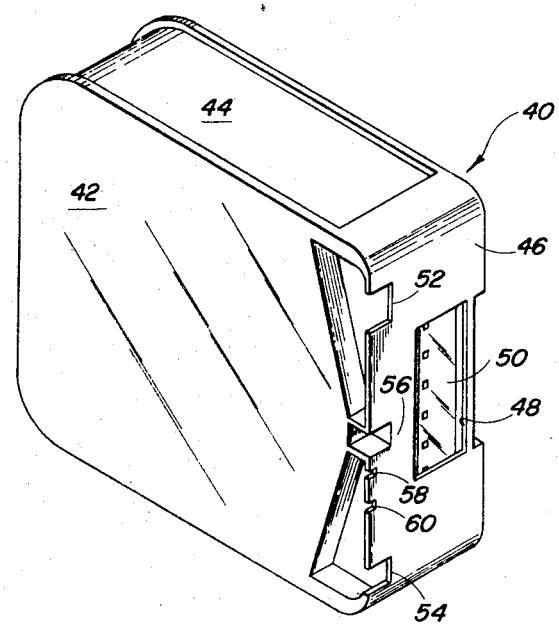
FIG. 3 is a perspective view of another embodiment of a film cartridge and illustrating an example of another code combination of a range of combinations.

In FIG. 3 I disclose a different type of film cartridge 40 used for movie film and in which two film chambers are provided (not shown) in side-by-side coaxial relation. The details of this cartridge construction may be seen in U.S. Patent Nos. 3,208,685 and 3,208,686, granted Sept. 28, 1965. The cover of this film cartridge is shown at 42 and the body is shown at 44. The cover 42 includes front wall 46 in which the exposure aperture 48 is formed. A section of the film 50 is illustrated in position within the exposure aperture 48.

In reference to FIG. 3, one edge of the front wall 46 adjacent the exposure aperture 48 serves as the exterior surface in which a tactile discontinuity or notch 52 is formed by the removal of material to represent a particular film characteristic such as the film emulsion speed. Also, another tactile discontinuity or notch 54 is similarly formed for cooperating with a filter mechanism in a camera. Further, a tactile reference discontinuity or notch 56 and two code discontinuities or notches 58, 60 are formed in similar manner in the same exterior surface. As stated above with respect to FIGS. 1 and 2, since the tactile reference discontinuity will not vary in location from cartridge to cartridge, it may also be formed at the same time that the cartridge is formed.

The tactile code discontinuities shown in FIG. 3 represent the code combination No. 12 from the series of combinations shown in Table B below. Each tactile code discontinuity is located a predetermined distance from the tactile reference discontinuity, and the latter is made wider than the code discontinuity so that there will be no confusion between the two types of discontinuities for the same reasons discussed in FIGS. 1 and 2. Such tactile reference discontinuities could also be made smaller than the tactile code discontinuities, as mentioned above with respect to FIGS. 1 and 2.

Figure 4:
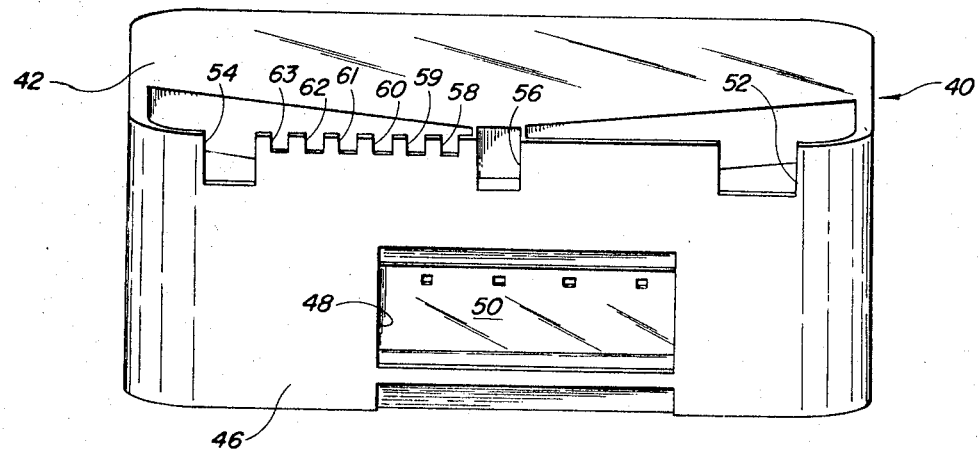
FIG. 4 is an enlarged revolved elevation view of the film cartridge shown in FIG. 3 and illustrating another range of combinations.

As will be evident from the arrangement disclosed in Table B below, there may be one code discontinuity in six different positions, or all six discontinuities in their positions, or many possible combinations therebetween. In FIG. 4, the additional code discontinuities 59, 61, 62, and 63 are illustrated along with code discontinuities 58 and 60 for a total of six (6) code discontinuities, which represent code combination No. 63 from Table B below.

Figure 5:
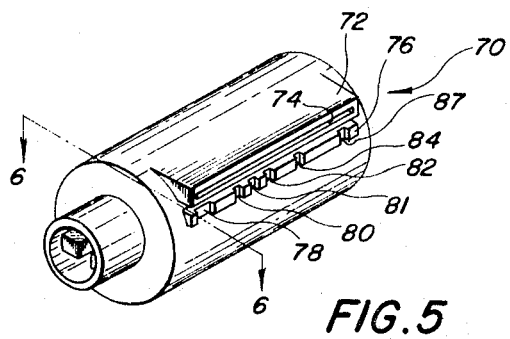
FIG. 5 is a perspective view of still another embodiment of a film cartridge and illustrating an example of still another code combination of a range of combinations similar to that shown in FIG. 2.

In FIG. 5 I disclose still another different type of film cartridge 70 containing a single film chamber and which cartridge is cylindrical in form. Extending tangentially from the surface of the cartridge is a structure which will be termed a tangential extension 72 and in which a film gate 74 is disposed. The film (not shown) passes through the film gate into and out of the cartridge. Disposed below the tangential extension 72 and parallel to the axis of the cartridge is a rib 76 integrally formed from the surface of the cartridge and which serves as the exterior surface in which tactile discontinuities are formed. A tactile reference discontinuity 78 is formed at one end of such rib 76 and tactile code discontinuities 80, 81, 82, 84 and 87 are formed with respect to such tactile reference discontinuity. The particular code combination shown in FIG. 5 is No. 178 from the series of combinations disclosed in Table A below.

Figure 6:
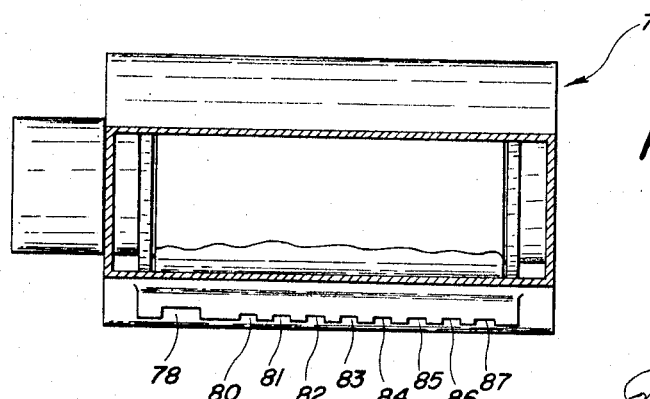
FIG. 6 is an enlarged elevation view taken along line 6—6 of the film cartridge shown in FIG. 5 and illustrating the range of combinations similar to that shown in FIG. 2.

As disclosed above with respect to FIGS. 1 and 2, the arrangement disclosed in Table A below shows that there may be one code discontinuity in 8 different positions, or all 8 discontinuities in their positions, or any possible combination therebetween. Such arrangement may also be applicable to the type of cartridge disclosed in FIGS. 5 and 6. In FIG. 6, the additional code discontinuities 83, 85 and 86 are illustrated along with code discontinuities 80, 81, 82, 84 and 87 for a total of eight (8) code discontinuities, which represent code combination No. 255 from Table A below.

The various combinations that may be possible are shown in the following tables which are believed to be self-explanatory, and it is to be understood that the combinations shown are only two examples of multiple code combinations that may be used:

TABLE A

| Notch Combination Code Number | Notch Location Number | | | | | | | |
|---|---|---|---|---|---|---|---|---|
| | 1 | 2 | 3 | 4 | 5 | 6 | 7 | 8 |
| 1 | 1 | | | | | | | |
| 2 | | 2 | | | | | | |
| 3 | | | 3 | | | | | |
| 4 | | | | 4 | | | | |
| 5 | | | | | 5 | | | |
| 6 | | | | | | 6 | | |
| 7 | | | | | | | 7 | |
| 8 | | | | | | | | 8 |
| 9 | 1 | 2 | | | | | | |
| 10 | | 2 | 3 | | | | | |
| 11 | | | 3 | 4 | | | | |
| 12 | | | | 4 | 5 | | | |
| 13 | | | | | 5 | 6 | | |
| 14 | | | | | | 6 | 7 | |
| 15 | | | | | | | 7 | 8 |
| 16 | 1 | | 3 | | | | | |
| 17 | | 2 | | 4 | | | | |
| 18 | | | 3 | | 5 | | | |
| 19 | | | | 4 | | 6 | | |
| 20 | | | | | 5 | | 7 | |
| 21 | | | | | | 6 | | 8 |
| 22 | 1 | | | 4 | | | | |
| 23 | | 2 | | | 5 | | | |
| 24 | | | 3 | | | 6 | | |
| 25 | | | | 4 | | | 7 | |
| 26 | | | | | 5 | | | 8 |
| 27 | 1 | | | | 5 | | | |
| 28 | | 2 | | | | 6 | | |
| 29 | | | 3 | | | | 7 | |
| 30 | | | | 4 | | | | 8 |
| 31 | 1 | | | | | 6 | | |
| 32 | | 2 | | | | | 7 | |
| 33 | | | 3 | | | | | 8 |
| 34 | 1 | | | | | | 7 | |
| 35 | | 2 | | | | | | 8 |
| 36 | 1 | | | | | | | 8 |
| 37 | 1 | 2 | 3 | | | | | |
| 38 | | 2 | 3 | 4 | | | | |
| 39 | | | 3 | 4 | 5 | | | |
| 40 | | | | 4 | 5 | 6 | | |
| 41 | | | | | 5 | 6 | 7 | |
| 42 | | | | | | 6 | 7 | 8 |
| 43 | 1 | 2 | | 4 | | | | |
| 44 | | 2 | 3 | | 5 | | | |
| 45 | | | 3 | 4 | | 6 | | |
| 46 | | | | 4 | 5 | | 7 | |
| 47 | | | | | 5 | 6 | | 8 |
| 48 | 1 | 2 | | | 5 | | | |
| 49 | | 2 | 3 | | | 6 | | |
| 50 | | | 3 | 4 | | | 7 | |
| 51 | | | | 4 | 5 | | | 8 |
| 52 | 1 | 2 | | | | 6 | | |
| 53 | | 2 | 3 | | | | 7 | |
| 54 | | | 3 | 4 | | | | 8 |
| 55 | 1 | 2 | | | | | 7 | |
| 56 | | 2 | 3 | | | | | 8 |
| 57 | 1 | 2 | | | | | | 8 |
| 58 | | | 3 | 4 | 5 | | | |
| 59 | | | 2 | | 4 | 5 | 6 | |
| 60 | | | | 3 | | 5 | 6 | |
| 61 | | | | | 4 | | 6 | 7 |
| 62 | | | | | | 5 | | 7 | 8 |
| 63 | 1 | | 3 | | 5 | | | |
| 64 | | 2 | | 4 | | 6 | | |
| 65 | | | 3 | | 5 | | 7 | |
| 66 | | | | 4 | | 6 | | 8 |
| 67 | 1 | | 3 | | | 6 | | |
| 68 | | 2 | | 4 | | | 7 | |
| 69 | | | 3 | | 5 | | | 8 |
| 70 | 1 | | 3 | | | | 7 | |
| 71 | | 2 | | 4 | | | | 8 |
| 72 | 1 | | 3 | | | | | 8 |
| 73 | 1 | | | 4 | 5 | | | |
| 74 | | 2 | | | 5 | 6 | | |
| 75 | | | 3 | | | 6 | 7 | |
| 76 | | | | 4 | | | 7 | 8 |
| 77 | 1 | | | 4 | | 6 | | |
| 78 | | 2 | | | 5 | | 7 | |
| 79 | | | 3 | | | 6 | | 8 |
| 80 | 1 | | | 4 | | | 7 | |
| 81 | | 2 | | | 5 | | | 8 |
| 82 | 1 | | | 4 | | | | 8 |
| 83 | | 2 | | | 5 | 6 | | |
| 84 | | | 3 | | | 6 | 7 | |
| 85 | | | | | | | 7 | 8 |
| 86 | 1 | | | | 5 | | | |
| 87 | | 2 | | | | 6 | 7 | 8 |
| 88 | 1 | | | | 5 | | | 8 |
| 89 | 1 | | | | | 6 | 7 | |

TABLE A—Continued

| Notch Combination Code Number | Notch Location Number | | | | | | | |
|---|---|---|---|---|---|---|---|---|
| | 1 | 2 | 3 | 4 | 5 | 6 | 7 | 8 |
| 90 | | 2 | | | | | 7 | 8 |
| 91 | 1 | | | | | 6 | | 8 |
| 92 | 1 | | | | | | 7 | 8 |
| 93 | 1 | 2 | 3 | 4 | | | | |
| 94 | | 2 | 3 | 4 | 5 | | | |
| 95 | | | 3 | 4 | 5 | 6 | | |
| 96 | | | | 4 | 5 | 6 | 7 | |
| 97 | | | | | 5 | 6 | 7 | 8 |
| 98 | 1 | 2 | 3 | | 5 | | | |
| 99 | | 2 | 3 | 4 | | 6 | | |
| 100 | | | 3 | 4 | 5 | | 7 | |
| 101 | | | | 4 | 5 | 6 | | 8 |
| 102 | 1 | 2 | 3 | | | 6 | | |
| 103 | | 2 | 3 | 4 | | | 7 | |
| 104 | | | 3 | 4 | 5 | | | 8 |
| 105 | 1 | 2 | 3 | | | | 7 | |
| 106 | | 2 | 3 | 4 | | | | 8 |
| 107 | 1 | 2 | 3 | | | | | 8 |
| 108 | 1 | 2 | | 4 | 5 | | | |
| 109 | | 2 | | 3 | | 5 | 6 | |
| 110 | | | 3 | 4 | | 6 | 7 | |
| 111 | | | | 4 | 5 | | 7 | 8 |
| 112 | 1 | 2 | | 4 | | 6 | | |
| 113 | | 2 | | 3 | 4 | 5 | | 7 | |
| 114 | | | 3 | 4 | | 6 | | 8 |
| 115 | 1 | 2 | | 4 | | | 7 | |
| 116 | | 2 | 3 | | 5 | | | 8 |
| 117 | 1 | 2 | | 4 | | | | 8 |
| 118 | 1 | 2 | | | 5 | 6 | | |
| 119 | | 2 | 3 | | | 6 | 7 | |
| 120 | | | 3 | 4 | | | 7 | 8 |
| 121 | 1 | 2 | | | 5 | | 7 | |
| 122 | | 2 | 3 | | | 6 | | 8 |
| 123 | 1 | 2 | | | 5 | | | 8 |
| 124 | 1 | 2 | | | | 6 | 7 | |
| 125 | | 2 | 3 | | | | 7 | 8 |
| 126 | 1 | 2 | | | | 6 | | 8 |
| 127 | 1 | 2 | | | | | 7 | 8 |
| 128 | 1 | | 3 | 4 | 5 | | | |
| 129 | | 2 | | 4 | 5 | 6 | | |
| 130 | | | 3 | | 5 | 6 | 7 | |
| 131 | | | | 4 | | 6 | 7 | 8 |
| 132 | 1 | | 3 | 4 | | 6 | | |
| 133 | | 2 | | 4 | 5 | | 7 | |
| 134 | | | 3 | | 5 | 6 | | 8 |
| 135 | 1 | | 3 | 4 | | | 7 | |
| 136 | | 2 | | 4 | 5 | | | 8 |
| 137 | 1 | | 3 | 4 | | | | 8 |
| 138 | 1 | | 3 | | 5 | 6 | | |
| 139 | | 2 | | 4 | | 6 | 7 | |
| 140 | | | 3 | | 5 | | 7 | 8 |
| 141 | 1 | | 3 | | 5 | | 7 | |
| 142 | | 2 | | 4 | | 6 | | 8 |
| 143 | 1 | | 3 | | 5 | | | 8 |
| 144 | 1 | | 3 | | | 6 | 7 | |
| 145 | | 2 | | 4 | | | 7 | 8 |
| 146 | 1 | | 3 | | | 6 | | 8 |
| 147 | 1 | | 3 | | | | 7 | 8 |
| 148 | | | | 4 | 5 | 6 | | |
| 149 | | 2 | | | 5 | 6 | 7 | |
| 150 | | | 3 | | | 6 | 7 | 8 |
| 151 | 1 | | | 4 | 5 | | 7 | |
| 152 | | 2 | | | 5 | 6 | | 8 |
| 153 | 1 | | | 4 | 5 | | | 8 |
| 154 | 1 | | | 4 | | 6 | 7 | |
| 155 | | 2 | | | 5 | | 7 | 8 |
| 156 | 1 | | | 4 | | 6 | | 8 |
| 157 | 1 | | | 4 | | | 7 | 8 |
| 158 | 1 | | | | 5 | 6 | 7 | |
| 159 | | 2 | | | | 6 | 7 | 8 |
| 160 | 1 | | | | 5 | 6 | | 8 |
| 161 | 1 | | | | 5 | | 7 | 8 |
| 162 | 1 | | | | | 6 | 7 | 8 |
| 163 | 1 | 2 | 3 | 4 | 5 | | | |
| 164 | | 2 | 3 | 4 | 5 | 6 | | |
| 165 | | | 3 | 4 | 5 | 6 | 7 | |
| 166 | | | | 4 | 5 | 6 | 7 | 8 |
| 167 | 1 | 2 | 3 | 4 | | 6 | | |
| 168 | | 2 | 3 | 4 | 5 | | 7 | |
| 169 | | | 3 | 4 | 5 | 6 | | 8 |
| 170 | 1 | 2 | 3 | 4 | | | 7 | |
| 171 | | 2 | 3 | 4 | 5 | | | 8 |
| 172 | 1 | 2 | 3 | 4 | | | | 8 |
| 173 | 1 | 2 | 3 | | 5 | 6 | | |
| 174 | | 2 | 3 | 4 | | 6 | 7 | |
| 175 | | | 3 | 4 | 5 | | 7 | 8 |
| 176 | 1 | 2 | 3 | | 5 | | 7 | |
| 177 | | 2 | 3 | 4 | | 6 | | 8 |
| 178 | 1 | 2 | 3 | | 5 | | | 8 |
| 179 | 1 | 2 | 3 | | | 6 | 7 | |
| 180 | | 2 | 3 | 4 | | | 7 | 8 |
| 181 | 1 | 2 | 3 | | | 6 | | 8 |
| 182 | 1 | 2 | 3 | | | | 7 | 8 |
| 183 | 1 | 2 | | 4 | 5 | 6 | | |
| 184 | | 2 | 3 | | 5 | 6 | 7 | |
| 185 | | | 3 | 4 | | 6 | 7 | 8 |
| 186 | 1 | 2 | | 4 | 5 | | 7 | |
| 187 | | 2 | 3 | | 5 | 6 | | 8 |
| 188 | 1 | 2 | | 4 | 5 | | | 8 |
| 189 | 1 | 2 | | 4 | | 6 | 7 | |
| 190 | | 2 | 3 | | 5 | | 7 | 8 |
| 191 | 1 | 2 | | 4 | | 6 | | 8 |
| 192 | 1 | 2 | | 4 | | | 7 | 8 |
| 193 | 1 | 2 | | | 5 | 6 | 7 | |
| 194 | | 2 | 3 | | | 6 | 7 | 8 |
| 195 | 1 | 2 | | | 5 | 6 | | 8 |
| 196 | 1 | 2 | | | 5 | | 7 | 8 |

TABLE A—Continued

| Notch Combination Code Number | Notch Location Number | | | | | | | |
|---|---|---|---|---|---|---|---|---|
| | 1 | 2 | 3 | 4 | 5 | 6 | 7 | 8 |
| 197 | 1 | 2 | | | | 6 | 7 | 8 |
| 198 | 1 | | 3 | 4 | 5 | 6 | | |
| 199 | | 2 | | 4 | 5 | 6 | 7 | |
| 200 | | | 3 | | 5 | 6 | 7 | 8 |
| 201 | 1 | | 3 | 4 | 5 | | 7 | |
| 202 | | 2 | | 4 | 5 | 6 | | 8 |
| 203 | 1 | | 3 | 4 | 5 | | | 8 |
| 204 | 1 | | 3 | 4 | | | 6 | 7 |
| 205 | | 2 | | 4 | 5 | | 7 | 8 |
| 206 | 1 | | 3 | 4 | | 6 | | 8 |
| 207 | 1 | | 3 | 4 | | | 7 | 8 |
| 208 | 1 | | 3 | | 5 | 6 | 7 | |
| 209 | | 2 | | 4 | | 6 | 7 | 8 |
| 210 | 1 | | 3 | | 5 | 6 | | 8 |
| 211 | 1 | | 3 | | 5 | | 7 | 8 |
| 212 | 1 | | 3 | | | 6 | 7 | 8 |
| 213 | 1 | | | 4 | 5 | 6 | 7 | |
| 214 | | 2 | | | 5 | 6 | 7 | 8 |
| 215 | 1 | | | 4 | 5 | 6 | | 8 |
| 216 | 1 | | | 4 | 5 | | 7 | 8 |
| 217 | 1 | | | 4 | | 6 | 7 | 8 |
| 218 | 1 | | | | 5 | 6 | 7 | 8 |
| 219 | 1 | 2 | 3 | 4 | 5 | 6 | | |
| 220 | | 2 | 3 | 4 | 5 | 6 | 7 | |
| 221 | | | 3 | 4 | 5 | 6 | 7 | 8 |
| 222 | 1 | 2 | 3 | 4 | 5 | | 7 | |
| 223 | | 2 | 3 | 4 | 5 | 6 | | 8 |
| 224 | 1 | 2 | 3 | 4 | 5 | | | 8 |
| 225 | 1 | 2 | 3 | 4 | | 6 | 7 | |
| 226 | | 2 | 3 | 4 | 5 | | 6 | 7 |
| 227 | 1 | 2 | 3 | 4 | | 6 | | 8 |
| 228 | 1 | 2 | 3 | 4 | | | 7 | 8 |
| 229 | 1 | 2 | 3 | | 5 | 6 | 7 | 8 |
| 230 | | 2 | 3 | 4 | | 6 | 7 | 8 |
| 231 | 1 | 2 | 3 | | 5 | 6 | | 8 |
| 232 | 1 | 2 | 3 | | 5 | | 7 | 8 |
| 233 | 1 | 2 | 3 | | | 6 | 7 | 8 |
| 234 | 1 | 2 | | 4 | 5 | 6 | 7 | |
| 235 | | 2 | 3 | | 5 | 6 | 7 | 8 |
| 236 | 1 | 2 | | 4 | 5 | 6 | | 8 |
| 237 | 1 | 2 | | 4 | 5 | | 7 | 8 |
| 238 | 1 | 2 | | 4 | | 6 | 7 | 8 |
| 239 | 1 | 2 | | | 5 | 6 | 7 | 8 |
| 240 | 1 | | 3 | 4 | 5 | 6 | 7 | |
| 241 | | 2 | | 4 | 5 | 6 | 7 | 8 |
| 242 | 1 | | 3 | 4 | 5 | 6 | | 8 |
| 243 | 1 | | 3 | 4 | 5 | | 7 | 8 |
| 244 | 1 | | 3 | 4 | | 6 | 7 | 8 |
| 245 | 1 | | 3 | | 5 | 6 | 7 | 8 |
| 246 | 1 | | | 4 | 5 | 6 | 7 | 8 |
| 247 | 1 | 2 | 3 | 4 | 5 | 6 | 7 | |
| 248 | | 2 | 3 | 4 | 5 | 6 | 7 | 8 |
| 249 | 1 | 2 | 3 | 4 | 5 | 6 | | 8 |
| 250 | 1 | 2 | 3 | 4 | 5 | | 7 | 8 |
| 251 | 1 | 2 | 3 | 4 | | 6 | 7 | 8 |
| 252 | 1 | 2 | 3 | | 5 | 6 | 7 | 8 |
| 253 | 1 | 2 | | 4 | 5 | 6 | 7 | 8 |
| 254 | 1 | | 3 | 4 | 5 | 6 | 7 | 8 |
| 255 | 1 | 2 | 3 | 4 | 5 | 6 | 7 | 8 |

TABLE B

| Notch Combination Code Number | Notch Location Number | | | | | |
|---|---|---|---|---|---|---|
| | 1 | 2 | 3 | 4 | 5 | 6 |
| 1 | 1 | | | | | |
| 2 | | 2 | | | | |
| 3 | | | 3 | | | |
| 4 | | | | 4 | | |
| 5 | | | | | 5 | |
| 6 | | | | | | 6 |
| 7 | 1 | 2 | | | | |
| 8 | | 2 | 3 | | | |
| 9 | | | 3 | 4 | | |
| 10 | | | | 4 | 5 | |
| 11 | | | | | 5 | 6 |
| 12 | 1 | | 3 | | | |
| 13 | | 2 | | 4 | | |
| 14 | | | 3 | | 5 | |
| 15 | | | | 4 | | 6 |
| 16 | 1 | | | 4 | | |
| 17 | | 2 | | | 5 | |
| 18 | | | 3 | | | 6 |
| 19 | 1 | | | | 5 | |
| 20 | | 2 | | | | 6 |
| 21 | 1 | | | | | 6 |
| 22 | 1 | 2 | 3 | | | |
| 23 | | 2 | 3 | 4 | | |
| 24 | | | 3 | 4 | 5 | |
| 25 | | | | 4 | 5 | 6 |
| 26 | 1 | 2 | | 4 | | |
| 27 | | 2 | 3 | | 5 | |
| 28 | | | 3 | 4 | | 6 |
| 29 | 1 | 2 | | | 5 | |
| 30 | | 2 | 3 | | | 6 |
| 31 | 1 | 2 | | | | 6 |
| 32 | 1 | | 3 | 4 | | |
| 33 | | 2 | | 3 | 4 | |
| 34 | | | 3 | | 5 | 6 |
| 35 | 1 | | 3 | | 5 | |
| 36 | | 2 | | 4 | | 6 |
| 37 | 1 | | 3 | | | 6 |
| 38 | 1 | | | 4 | 5 | |
| 39 | | 2 | | | | 5 |
| 40 | 1 | | | | 4 | |
| 41 | 1 | | | | | 5 |

TABLE B—Continued

| Notch Combination Code Number | Notch Location Number | | | | | |
|---|---|---|---|---|---|---|
| | 1 | 2 | 3 | 4 | 5 | 6 |
| 42 | 1 | 2 | 3 | 4 | | |
| 43 | | 2 | 3 | 4 | 5 | |
| 44 | | | 3 | 4 | 5 | 6 |
| 45 | 1 | 2 | 3 | | 5 | |
| 46 | | 2 | 3 | 4 | | 6 |
| 47 | 1 | 2 | 3 | | | 6 |
| 48 | 1 | 2 | | 4 | 5 | |
| 49 | | 2 | 3 | | 5 | 6 |
| 50 | 1 | 2 | | 4 | | 6 |
| 51 | 1 | 2 | | | 5 | 6 |
| 52 | 1 | | 3 | 4 | 5 | |
| 53 | | 2 | | 4 | 5 | 6 |
| 54 | 1 | | 3 | 4 | | 6 |
| 55 | 1 | | 3 | | 5 | 6 |
| 56 | 1 | | | 4 | 5 | 6 |
| 57 | 1 | 2 | 3 | 4 | 5 | |
| 58 | | 2 | 3 | 4 | 5 | 6 |
| 59 | 1 | 2 | 3 | 4 | | 6 |
| 60 | 1 | 2 | 3 | | 5 | 6 |
| 61 | 1 | 2 | | 4 | 5 | 6 |
| 62 | 1 | | 3 | 4 | 5 | 6 |
| 63 | 1 | 2 | 3 | 4 | 5 | 6 |

In operation, the film cartridges would be oriented along a conveyor-like mechanism (not shown) by mechanisms not disclosed so that as the film cartridges passed along such conveyor mechanism the tactile reference discontinuity would be in foremost position to be followed by the tactile code combination. The sensing of the tactile reference discontinuity would condition the code sensing device of the apparatus (not shown) in a state of readiness for subsequent detection of the tactile code discontinuities. These code sensing devices would be oriented relative to the tactile reference discontinuity of each film cartridge so that the proper code sensing devices would be in alignment with the particular tactile code combination concerned. The apparatus for sorting is not disclosed in this application as it is not the subject of this invention.

Although the tactile code discontinuities shown herein have been disclosed as being spaced a predetermined distance from each other, it should be recognized that still further combinations would be possible by the elimination of such spacing with the result that each tactile code discontinuity would have a predetermined width and the next successive tactile code discontinuity, also of predetermined width, would immediately follow without interruption of space therebetween.

Although the foregoing description relates to specific embodiments of the invention, it is obvious that variations and modifications can be effected within the spirit and scope of the invention. Accordingly, the present disclosure is to be considered as illustrative.

I claim:

1. An improved film cartridge provided with coding means uniquely indicative of the type of film contained therein and adapted for use with apparatus of the type having code sensing means for cooperation with the coding means on the cartridge to control the operation of the apparatus in accordance with the type of film contained in the cartridge, said coding means comprising at least two substantially identical coding discontinuities each located at one of at least three adjacent code positions arranged on an exterior surface of said cartridge in a predetermined spaced relation along a substantially straight line, and an additional discontinuity by which the cartridge and the apparatus are oriented with respect to the sensing means of such apparatus, the spacing of each such coding discontinuity from said additional discontinuity being in accordance with a predetermined film characteristic coding system.

2. A film cartridge as defined in claim 1 wherein said discontinuities are notches formed in said exterior surface.

3. A film cartridge as defined in claim 1 wherein said additional discontinuity distinguishes in size over said coding discontinuities.

4. A film cartridge as defined in claim 1 wherein the plurality of relatively spaced code positions are in straight line alignment relative to each other along said exterior surface of the cartridge.

5. A film cartridge as defined in claim 1, said cartridge having a wall which constitutes said exterior surface and an exposure aperture adjacent said wall.

6. A film cartridge as defined in claim 5, said cartridge having a pair of film receiving chambers, and said wall serving to space and connect said chambers, said exposure aperture being disposed in said wall between said film receiving chambers.

7. A film cartridge as defined in claim 1, said cartridge being cylindrical in shape and having a tangential extension and a film gate opening into the extension, said cartridge further having an integrally formed rib disposed adjacent and parallel to said film gate and which constitutes said exterior surface.

References Cited

UNITED STATES PATENTS

| | | | |
|---|---|---|---|
| 3,125,939 | 3/1964 | Bundschuh et al. | 95—31 |
| 3,266,395 | 8/1966 | Kremp et al. | 95—31 |
| 3,212,421 | 10/1965 | Hackenberg | 95—10 |
| 3,266,398 | 8/1966 | Kremp et al. | 95—10 |

NORTON ANSHER, *Primary Examiner.*

R. A. SCHROEDER, *Assistant Examiner.*

U.S. Cl. X.R.

95—62, 10.